(12) United States Patent
Ogawa

(10) Patent No.: US 11,222,144 B2
(45) Date of Patent: Jan. 11, 2022

(54) SELF-ENCRYPTING STORAGE DEVICE AND PROTECTION METHOD

(71) Applicant: Toshiba Memory Corporation, Tokyo (JP)

(72) Inventor: Takaya Ogawa, Kawasaki Kanagawa (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 375 days.

(21) Appl. No.: 16/286,520

(22) Filed: Feb. 26, 2019

(65) Prior Publication Data

US 2020/0065528 A1 Feb. 27, 2020

(30) Foreign Application Priority Data

Aug. 21, 2018 (JP) .............................. JP2018-154777

(51) Int. Cl.
  *G06F 21/78* (2013.01)
  *G06F 3/06* (2006.01)
  *G06F 1/3228* (2019.01)
  *H04L 9/08* (2006.01)

(52) U.S. Cl.
  CPC .......... *G06F 21/78* (2013.01); *G06F 1/3228* (2013.01); *G06F 3/0622* (2013.01); *G06F 3/0634* (2013.01); *G06F 3/0658* (2013.01); *G06F 3/0679* (2013.01); *H04L 9/0894* (2013.01)

(58) Field of Classification Search
  CPC .......... G06F 3/062–0623; G06F 21/78; H04L 9/0894
  See application file for complete search history.

(56) References Cited

U.S. PATENT DOCUMENTS

| 6,711,264 | B1* | 3/2004 | Matsumoto | ........... | H04L 9/0891 |
| | | | | | 380/277 |
| 9,087,210 | B2 | 7/2015 | Baryudin et al. | | |
| 2008/0304364 | A1* | 12/2008 | Holtzman | ............... | G06F 21/10 |
| | | | | | 368/10 |
| 2009/0037654 | A1* | 2/2009 | Allison | ................... | G06F 21/79 |
| | | | | | 711/112 |

(Continued)

FOREIGN PATENT DOCUMENTS

| CN | 101043326 B | 2/2011 |
| CN | 104951409 A | 9/2015 |
| CN | 107408175 A | 11/2017 |

OTHER PUBLICATIONS

"TCG Storage Opal Integration Guidelines, Version 1.00 Revision 1.00" Trusted Computing Group, Mar. 16, 2016.
"NVM Express Revision 1.3a", NVM Express, Inc. Oct. 24, 2017.

*Primary Examiner* — Nicholas J Simonetti
(74) *Attorney, Agent, or Firm* — Kim & Stewart LLP

(57) ABSTRACT

A storage device includes a controller configured to control the storage device, and a storage area for security information, the security information including flag information indicating whether reading or writing of data from/to the storage device is permitted and time information indicating a cumulative time value during which power of the storage device has been turned on. When a first command is received from a host device, the controller generates encrypted data by encrypting data obtained by combining the time information and the security information, and after transmitting the encrypted data to the host device, shifts the storage device to a low power state.

20 Claims, 9 Drawing Sheets

(56) References Cited

U.S. PATENT DOCUMENTS

| | | | |
|---|---|---|---|
| 2011/0258456 A1* | 10/2011 | Lyakhovitskiy | G06F 21/78 713/189 |
| 2012/0072735 A1* | 3/2012 | Fukawa | G06F 21/725 713/189 |
| 2012/0260023 A1* | 10/2012 | Nagai | G06F 21/81 711/103 |
| 2014/0122867 A1* | 5/2014 | Shrinivasan | H04L 63/0428 713/155 |
| 2014/0310532 A1* | 10/2014 | Ali | G06F 12/1408 713/189 |
| 2015/0242657 A1* | 8/2015 | Kim | G06F 21/78 713/193 |
| 2015/0248568 A1* | 9/2015 | Offenberg | G06F 21/78 713/193 |
| 2016/0070493 A1 | 3/2016 | Oh et al. | |
| 2016/0231803 A1 | 8/2016 | Iwai et al. | |
| 2016/0285638 A1 | 9/2016 | Pearson et al. | |
| 2017/0177381 A1* | 6/2017 | Altman | G06F 9/4416 |
| 2017/0270308 A1* | 9/2017 | Nakayama | G06F 3/0683 |
| 2017/0277916 A1 | 9/2017 | Natarajan et al. | |
| 2018/0262336 A1* | 9/2018 | Fujiwara | G07C 9/00857 |
| 2020/0036538 A1* | 1/2020 | Ramlall | H04L 9/3278 |

\* cited by examiner

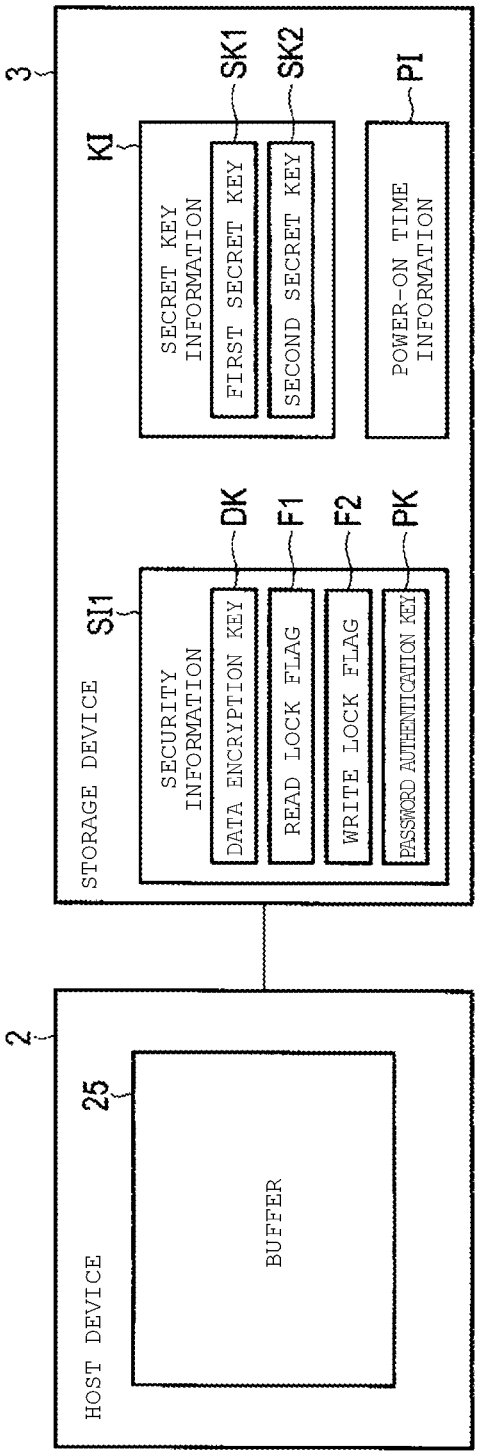
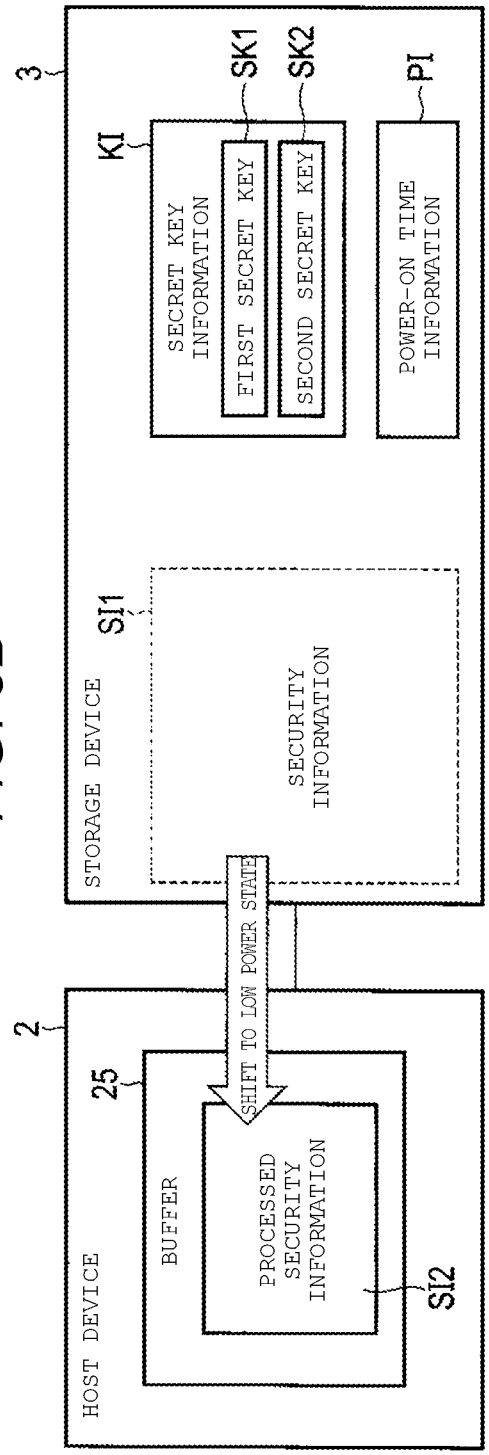

SELF-ENCRYPTING STORAGE DEVICE AND PROTECTION METHOD

CROSS-REFERENCE TO RELATED APPLICATION

This application is based upon and claims the benefit of priority from Japanese Patent Application No. 2018-154777, filed Aug. 21, 2018, the entire contents of which are incorporated herein by reference.

FIELD

Embodiments described herein relate generally to a storage device and a program.

BACKGROUND

In recent years, a self-encrypting drive (SED) which is a storage device having a data encryption function has been used. The self-encrypting drive has a built-in secret key, and the safety and confidentiality of the drive are secured by prohibiting reading of this secret key from the outside.

The self-encrypting drive has an authentication function and is unlocked, for example, by a password entered via a host device. After being unlocked, the self-encrypting drive permits reading and writing by the host device, and then enters in a locked state again as the power of the drive is turned off.

DESCRIPTION OF THE DRAWINGS

FIGS. 3A and 3B are diagrams showing an example of a storage state of each data in the computer system according to the first embodiment.

DETAILED DESCRIPTION

Figure 1:
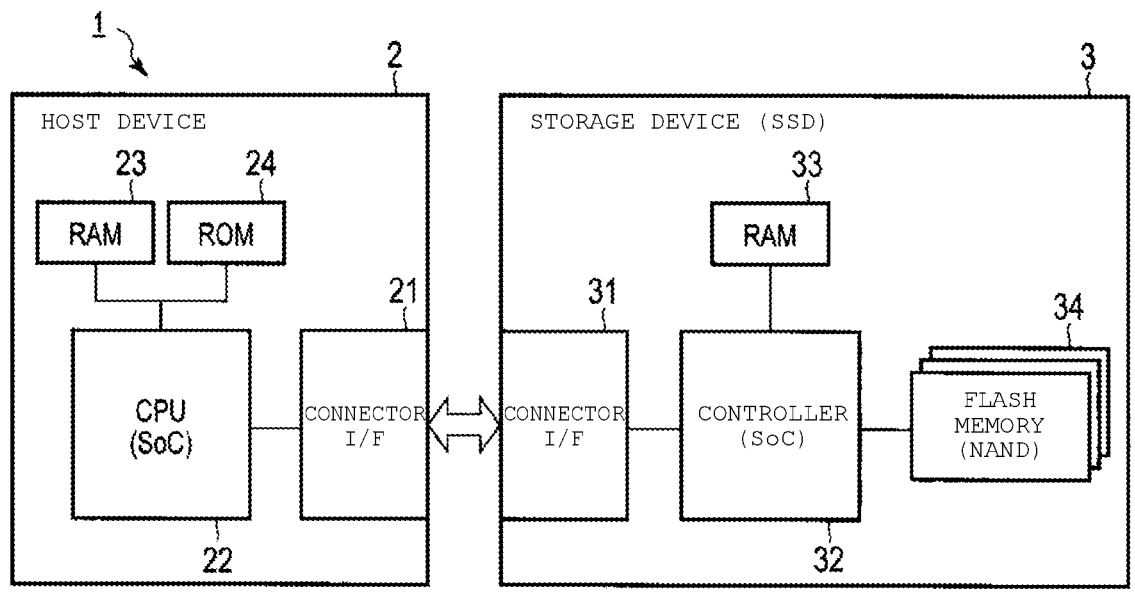
FIG. 1 is a block diagram showing an example of a configuration of a storage device according to a first embodiment and a computer system including the storage device.

Embodiments provide a storage device and a program for safely returning the storage device to an unlocked state while lowering standby power.

In general, according to one embodiment, a storage device includes a controller configured to control the storage device, and a storage area for security information, the security information including flag information indicating whether reading or writing of data from/to the storage device is permitted and time information indicating a cumulative time value during which power of the storage device has been turned on. When a first command is received from a host device, the controller generates encrypted data by encrypting data obtained by combining the time information and the security information, and after transmitting the encrypted data to the host device, shifts the storage device to a low power state.

For example, when an access frequency decreases, generally, a storage device is controlled to shift from a normal state to a low power state to save power consumption. In a self-encrypting drive, it is preferable to return from the low power state to the normal state without requiring a re-entry of a password. Further, when the power of the self-encrypting drive is turned off due to battery exhaustion, theft, and the like, it is possible to prevent leakage of data stored in the drive by causing the storage device to enter into the locked state again.

As a method of achieving the low power state, for example, a method of holding a part of the internal state of the self-encrypting drive in a storage circuit with extremely small standby power such as retention static random access memory (SRAM), retention flip flop (FF), or the like is conceivable. When returning from the low power state, the contents held in the storage circuit are written back to a normal storage area. Here, when an unintended power failure occurs, safety of the drive is guaranteed by relocking the drive and erasing the contents of the retention SRAM and retention FF. However, when this method is used, since power supply is necessary for the storage circuit, standby power is required slightly.

As another method for achieving the low power state, for example, a method of storing a part of the above state in a nonvolatile memory such as a NAND flash memory and then completely turning off the power of the drive is conceivable. In this method, standby power of the drive is zero. However, if it is distinguished whether the drive is returning from the low power state or is in the cold boot when the power is turned on, for example, by an external input signal, there is a possibility that data stored in the drive will be stolen. Specifically, by disconnecting drive in a low power state from a certain system and connecting the drive to another system, and then turning on the power of the drive as if the drive seemed to return from the low power state, an attack may be possible which wakes up the drive in the unlocked state. In addition, frequent writing to the nonvolatile memory leads to wearing out of the nonvolatile memory.

In addition, as another method for achieving the low power state, a method of turning off the power of the self-encrypting drive in a state in which unencrypted password (that is, plaintext) is stored in a secure area of the host device is conceivable. Thereafter, the power of the drive is turned on, recovered from the low power state, and the password is read from the host device. In this method, standby power of the drive is zero. However, when the host device is stolen together with the drive, for example, the password is leaked by reading the password flowing through a bus interface (for example, serial ATA (SATA), peripheral component interconnect (PCI), dual inline memory module (DIMM), and the like) with a measuring device or the like. This also applies to the case where the internal state of the drive instead of the password is stored in the host device.

In each of the embodiments described below, when transitioning the storage device, which is a self-encrypting drive, to the low power (or power-off) state, the storage device is capable of safely saving a secret key used for encrypting data stored in a storage device and/or confidential information such as the locked state of the storage device in an area that is not necessarily secure such as a predetermined buffer of a host device.

Specifically, the storage device performs encryption processing and tampering prevention processing on confidential information stored in the storage device and saves the processed data to the host device. At this time, the information indicating power-on time is saved to a nonvolatile memory or the like in the storage device, for example. When restoring the data, the storage device verifies the authenticity of the data using the information indicating the power-on time. In this way, confidential information of the storage device may be safely saved and restored to the host device, and replay attack may be prevented.

Hereinafter, each embodiment will be described with reference to the drawings. In the following description, substantially the same functions and elements are denoted by the same reference numerals and described as necessary.

First Embodiment

The computer system according to the present embodiment includes a storage device connected to a host device through an interface of the PCIe (PCI Express) standard and supporting a host memory buffer of the NVMe standard. Supporting the host memory buffer means that a part of the DRAM of the host device is used as a buffer of the storage device. In addition, the storage device realizes the low power state within the behavior defined by the NVMe standard.

FIG. 1 is a block diagram showing an example of a configuration of a storage device according to the present embodiment and a computer system 1 including the storage device.

The computer system 1 includes a host device 2 and a storage device 3.

The host device 2 is an information processing device such as a personal computer (PC), a smartphone, or the like.

The host device 2 includes a connector interface (I/F) 21, a central processing unit (CPU) 22, a random access memory (RAM) 23, and a read only memory (ROM) 24. The connector interface 21, the RAM 23, and the ROM 24 are electrically connected to the CPU 22, respectively.

The connector interface 21 performs interface processing between the host device 2 and the storage device 3. More specifically, the connector interface 21 transmits and receives commands, addresses, data, information, commands, signals, and the like to and from the storage device 3 via the connector interface 31 of the storage device 3 to be described later. The connector interface 21 is, for example, an interface of the PCIe standard.

The CPU 22 is a processor that controls the operation of the host device 2. The CPU 22 is controlled by, for example, a control program stored in the ROM 24.

The CPU 22 transmits commands and the like for controlling the storage device 3 to the storage device 3 via the connector interface 21. In addition, the CPU 22 stores the data and the like received from the storage device 3 via the connector interface 21 in the RAM 23, the ROM 24, or the like.

The RAM 23 is used as a work area of the CPU 22, and a control program and various data necessary for executing the control program are stored therein. The RAM 23 may be used as, for example, a cache memory for temporarily storing data. The RAM 23 is a volatile memory such as static random-access memory (SRAM) or dynamic random-access memory (DRAM), for example.

The ROM 24 is a nonvolatile memory that stores software such as a control program used by the CPU 22 or firmware.

The CPU 22 may be configured as a system on chip (SoC). In a case where the CPU 22 is an SoC, the RAM 23 and/or the ROM 24 may be provided in the CPU 22.

The storage device 3 is a storage device such as a solid state drive (SSD), for example. The storage device 3 may be a hard disk drive (HDD) or the like.

The storage device 3 includes a connector interface (I/F) 31, a controller 32, a RAM 33, a flash memory 34, and the like. The connector interface 31, the RAM 33, and the flash memory 34 are electrically connected to the controller 32, respectively.

Like the connector interface 21, the connector interface 31 performs interface processing between the storage device 3 and the host device 2. The connector interface 31 may be provided in the controller 32.

The controller 32 is an SoC that controls the operation of the entire storage device 3. When the storage device 3 shifts to the low power state, the controller 32 performs encryption processing and tampering prevention processing on predetermined data (e.g., security information to be described later) in the storage device 3. The controller 32 transmits the security information subjected to these kinds of processing to the host device 2. In addition, when the storage device 3 returns from the low power state, the controller 32 reads the security information from the host device 2 and performs verification processing and decryption processing on the read security information.

Details of the configuration of the controller 32 will be described later with reference to FIG. 2. In addition, details of the processing executed by the controller 32 will be described later with reference to FIGS. 3A and 3B.

The RAM 33 is used as a work area of the controller 32. The RAM 33 also may be used as, for example, a cache memory for temporarily storing data. Like the RAM 23, the RAM 33 is a volatile memory such as SRAM, DRAM, or the like.

The flash memory 34 is a nonvolatile memory constituting a storage area of the storage device 3. The flash memory 34 is, for example, a NAND-type flash memory, but may be another nonvolatile semiconductor memory such as a NOR-type flash memory, magnetoresistive random access memory (MRAM), phase change random access memory (PRAM), resistive random-access memory (ReRAM), ferroelectric random-access memory (FeRAM) or the like. For example, the flash memory 34 may be another nonvolatile memory, a magnetic memory, or the like. For example, the flash memory 34 may be a three-dimensional memory. The above-described ROM 24 is, for example, the same type of memory as the flash memory 34.

Figure 2:
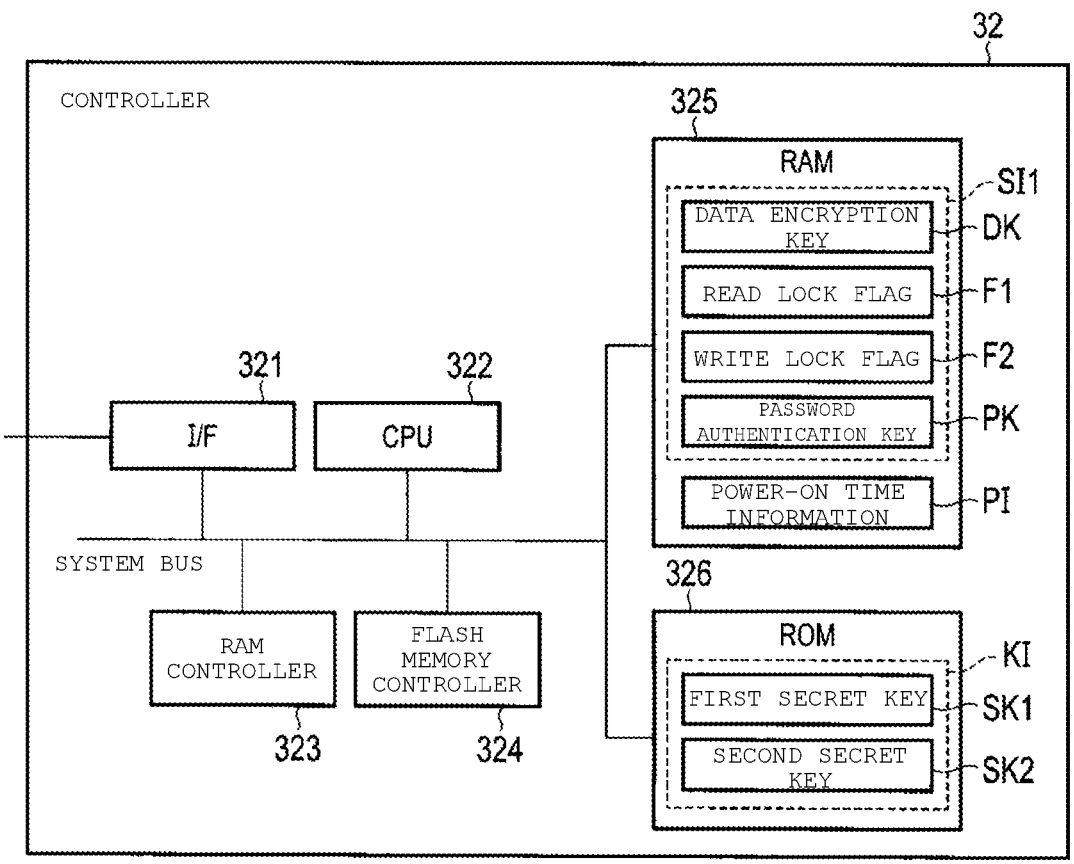
FIG. 2 is a block diagram showing an example of a configuration of a controller of the storage device according to the first embodiment.

FIG. 2 is a block diagram showing an example of the configuration of the controller of the storage device according to the present embodiment.

The controller 32 includes an interface (I/F) 321, a CPU 322, a RAM controller 323, a flash memory controller 324, a RAM 325, a ROM 326, and the like and are connected by a system bus.

The interface 321 performs interface processing for access to the controller 32. The interface 321 is, for example, an interface of the PCIe standard or the like.

The CPU 322 is a processor that controls the operation of the controller 32. Like the CPU 22 of the host device 2, the CPU 322 is controlled by a predetermined control program or the like.

The RAM controller 323 is a controller for controlling the above-described RAM 33. In addition, the flash memory controller 324 is a controller for controlling the above-described flash memory 34.

The RAM 325 is a volatile memory constituting a storage area inside the controller 32. The RAM 325 stores, for example, a data encryption key DK, a read lock flag F1, a write lock flag F2, a password authentication key PK, power-on time information PI, and the like.

The data encryption key DK is key information for encrypting the data stored in the flash memory 34. When storing data in the flash memory 34, the controller 32 encrypts the data by using the data encryption key DK. For the data encryption key DK, for example, Advanced Encryption Standard (AES) in XTS mode or the like is used. The size of the data encryption key is, for example, 512 bits.

The read lock flag F1 and the write lock flag F2 are flag information indicating permission/rejection status for accessing the storage device 3.

The read lock flag F1 is a flag for managing whether or not the storage device 3 is in a read-disabled state. When the storage device 3 is in a read-disabled state, the controller 32 refuses to read the data stored in the flash memory 34 of the storage device 3. For example, when the read lock flag F1 is on, the storage device 3 enters into a read-disabled state, and when the read lock flag F1 is off, the storage device 3 enters into a read-enabled state.

The write lock flag F2 is a flag for managing whether or not the storage device 3 is in a write-disabled state. When the storage device 3 is in a write-disabled state, the controller 32 refuses to write data to the flash memory 34 of the storage device 3. For example, when the write lock flag F2 is on, the storage device 3 enters into a write-disabled state, and when the write lock flag F2 is off, the storage device 3 enters into a write-enabled state.

The data sizes of the read lock flag F1 and the write lock flag F2 are, for example, 1 bit.

The password authentication key PK is data representing a password for allowing a user to access the storage device 3 via the host device 2, for example. When accessing the storage device 3, the user enters a predetermined password to the storage device 3 via the host device 2. The host device 2 transmits the entered password to the storage device 3. The controller 32 compares the password received from the host device 2 with the password authentication key PK, and when the two match, it is determined that the authentication of the user is successful and the access of the user to the storage device 3 is permitted.

It is preferable that the password authentication key PK includes a plurality of pieces of password information corresponding to a plurality of users. The data size of the password authentication key PK is, for example, 256 bits for each user.

The data encryption key DK, the read lock flag F1, the write lock flag F2, the password authentication key PK and the like described above are saved to the host device 2 when the storage device 3 shifts to a low power state. Hereinafter, these data to be saved to the host device 2 are collectively referred to as security information SI1.

The data encryption key DK and password authentication key PK may optionally be included in the security information SI1. That is, the security information SI1 includes at least the read lock flag F1 and the write lock flag F2. When the storage device 3 shifts to the low power state, the controller 32 may save the data encryption key DK and the password authentication key PK to, for example, the ROM 326 or the flash memory 34.

In addition, the security information SI1 may further include various kinds of intermediate security information generated when unlocking the storage device 3 by password entered from the user, or other information.

The power-on time information PI is information representing the cumulative time value during which the power of the storage device 3 has been turned on from product shipment to the present. The power-on time information PI is, for example, a value of a counter indicating the elapse of a unit time, and a value is added every time the unit time elapses. The unit time is preferably about 1 millisecond or less, for example.

In the power-on time information PI, addition of values is stopped after the power of the storage device 3 is turned off, and addition of the values is started again after the power is turned on again. For this reason, the power-on time information PI is stored in the ROM 326, the flash memory 34, or the like in a non-volatilized manner when the power is turned off. The power-on time information PI may be stored in the RAM 33 while the power is turned on.

Generally, in the solid state drive (SSD), the power-on time information PI is stored in the SSD as a part of the management information. For example, in the NVMe standard, this management information is SMART information that may be acquired by a "Get Log Page" command. The power-on time information PI is a value represented by the item "Power On Hours" in this SMART information.

The ROM 326 is a nonvolatile memory constituting a storage area inside the controller 32. The ROM 326 stores, for example, secret key information KI. The secret key information KI includes, for example, a first secret key SK1, a second secret key SK2, and the like.

The first secret key SK1 is a fixed secret key for encrypting the security information SI1. More specifically, the first secret key SK1 is key information used when the security information SI1 is encrypted and decrypted by AES, for example. The data size of the first secret key SK1 is, for example, 256 bits.

The second secret key SK2 is key information used when applying the tampering prevention processing to the security information SI1. More specifically, the second secret key SK2 is key information used for calculating a unique value (message authentication code) for the security information SI1, for example, by the hash-based message authentication code (HMAC) method. In the case of the HMAC method, the message authentication code is an output value of a cryptographic hash function. In addition, the data size of the second secret key SK2 is, for example, 256 bits.

The RAM 33 may be provided in the RAM 325. In addition, the RAM 325 and/or the ROM 326 may be disposed outside the controller 32.

FIGS. 3A and 3B are diagrams showing an example of the storage state of each piece of data in the computer system according to the present embodiment.

First, FIG. 3A shows the storage state of each piece of data before the storage device 3 shifts to the low power state.

As described above, the storage device 3 includes security information SI1, secret key information KI, and power-on time information PI. In addition, a buffer 25 of the host device 2 does not include these pieces of information. The buffer 25 is a storage area implemented in, for example, the RAM 23 or the like. More specifically, the buffer 25 is a host memory buffer of the NVMe standard or the like as described above.

Next, FIG. 3B shows the storage state of each piece of data after the storage device 3 shifts to the low power state. When the storage device 3 shifts to the low power state, the controller 32 performs encryption processing and tampering prevention processing on the security information SI1. In this way, the security information SI1 is converted into processed security information SI2. Further, the controller 32 transmits the processed security information from the RAM 325 to the host device 2. The host device 2 stores the processed security information SI2 in the buffer 25.

In addition, when the storage device 3 returns from the low power state, the controller 32 reads the processed security information SI2 from the host device 2 and performs verification processing and decryption processing on the read processed security information SI2 to restore the security information SI1 to the RAM 325.

Figure 4:
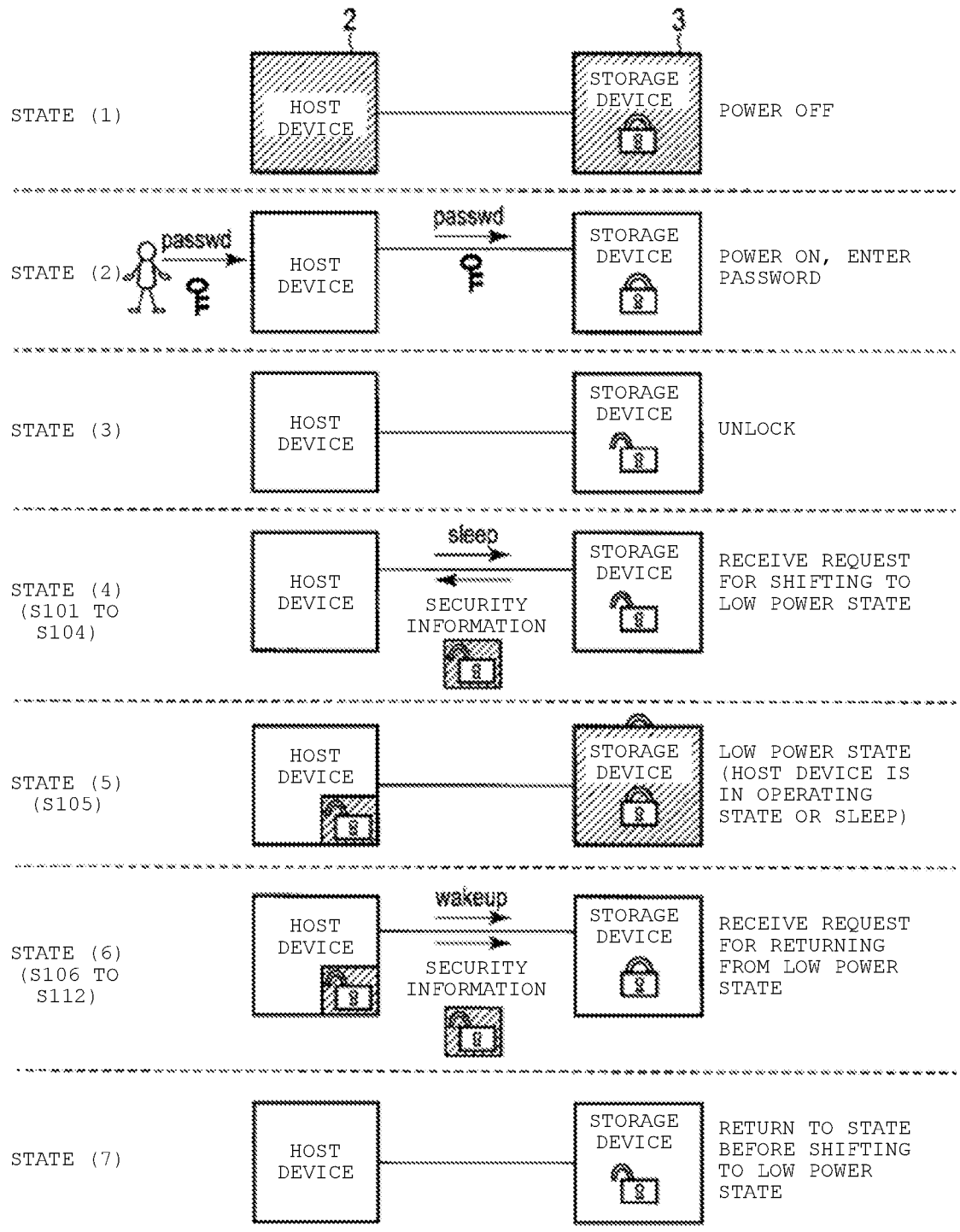
FIG. 4 is a diagram showing an example of a shift operation to a low power state and a return operation from the low power state of the computer system according to the first embodiment.
Figure 5:
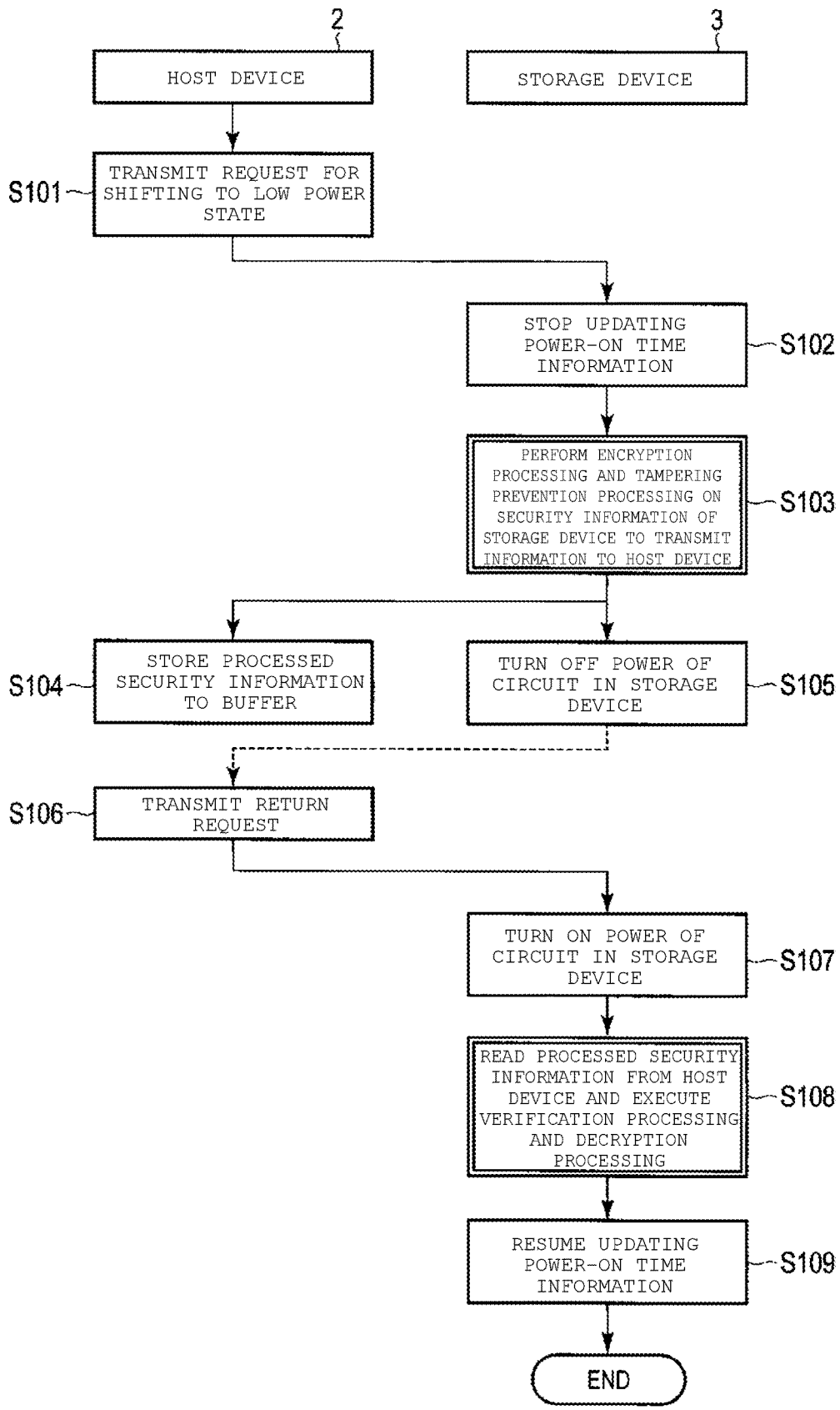
FIG. 5 is a flowchart showing an example of shift processing to the low power state and return processing from the low power state in the computer system according to the first embodiment.

With reference to FIGS. 4 and 5, details of the processing of shifting the storage device 3 to the low power state and the processing of returning from the low power state of the storage device 3 will be described below.

FIG. 4 is a diagram showing an example of a shift operation to the low power state and a return operation from the low power state of the computer system according to the present embodiment.

The state (1) indicates the initial state of the host device 2 and the storage device 3. It is assumed that the host device 2 and the storage device 3 are in a power-off state.

The state (2) indicates a state in which a password is entered and input to the storage device 3. After the state (1), the power of the host device 2 and the storage device 3 is turned on (power-on), and the host device 2 and the storage device 3 enter into a power-on state. The user enters a password for accessing the storage device 3 to the storage device 3 via the host device 2.

The state (3) indicates a state in which access to the storage device 3 is permitted. After the state (2), the controller 32 of the storage device 3 compares the entered password with the password authentication key PK. When the two match, the controller 32 determines that the authentication of the user is successful and permits the user to access the storage device 3.

Instead of comparing the entered password with the password authentication key PK itself, for example, the challenge response authentication by the HMAC method or the like, in which the message authentication codes are compared with each other, may be used. Even in this case, in order to generate a message authentication code (MAC value), the value of the entered plaintext password is necessary. Therefore, if the password is stored in the host as a plaintext, there is a possibility that the password is leaked by analyzing the password flowing through the bus by the measuring device or the like as described above.

The state (4) indicates a state after the storage device 3 receives a request for shifting to the low power state from the host device 2. The storage device 3 generates processed security information SI2 and transmits the information to the host device 2.

The state (5) indicates the low power state of the storage device 3. In this low power state, the storage device 3 turns off all the power except the function necessary for returning to the normal state from the low power state upon receiving a return request from the host.

The state (6) indicates a state after the storage device 3 receives a request for returning to the normal state from the low power state from the host device 2. The storage device 3 receives the processed security information SI2 from the host device 2.

The state (7) indicates a normal state, before shifting to the low power state, to which the storage device returns. The controller 32 restores the security information SI1 by performing verification processing and decryption processing on the processed security information SI2 received from the host device 2.

FIG. 5 is a flowchart showing an example of shift processing to the low power state and return processing from the low power state in the computer system according to the present embodiment.

The processing in steps S101 to S104 corresponds to the state (4) in FIG. 4, the processing in step S105 corresponds to the state (5) in FIG. 4, and the processing in steps S106 to S112 corresponds to the state (6) in FIG. 4.

In step S101, the CPU 22 of the host device 2 transmits a request for shifting to the low power state to the storage device 3. More specifically, the CPU 22 issues, for example, a "Set Features" command of the NVMe standard. This command is a command for requesting the storage device 3 to set the "Power State" of "Power Management Feature" to be defined in the NVMe standard to the lowest power state. The lowest power state is, for example, "Non-Operational Power State" of the NVMe standard and is a state in which I/O commands (read command, write command, and the like) may not be processed. In the present embodiment, it is assumed that the "Power State" of the PCIe standard is in a state in which the power is not turned off (for example, D0 or the like).

The controller 32 of the storage device 3 receives the request. The controller 32 waits for the completion of the I/O commands already issued from the host device 2 in order to shift to the low power state.

In step S102, after confirming that the I/O commands already issued from the host device 2 have completed, the controller 32 stops updating the power-on time information PI, and saves the power-on time information PI in a non-volatile memory (ROM 326 and flash memory 34) or a retention SRAM, a retention FF, and the like (not shown) so that the counter value of the power-on time information PI is retained.

In step S103, the controller 32 performs encryption processing and tampering prevention processing on the security information of the storage device 3 to generate processed security information SI2. The controller 32 transmits the generated processed security information SI2 to the host device 2. Details of the encryption processing and the tampering prevention processing will be described later with reference to FIGS. 6 and 7.

In step S103, if there is any data to be saved in the host device 2 in addition to the processed security information SI2, such data is also transmitted to the host device 2.

In step S104, the CPU 22 of the host device 2 stores the received processed security information SI2 in the buffer 25.

In step S105, the controller 32 turns off the power of the circuit in the storage device 3. More specifically, the controller 32 turns off the power excluding the circuit necessary for executing the minimum functions (functions other than I/O commands such as access to PCI Configuration Space or NVMe Admin Queue) defined in the NVMe standard, for example, via a power control circuit in the storage device 3.

Thereafter, in step S106, the CPU 22 of the host device 2 transmits a request for returning to the normal state from the low power state to the storage device 3. More specifically, the CPU 22 issues the "Set Features" command of the NVMe standard. This command is the same command as in step S103, but has different arguments, for example. This command is a command for requesting the storage device 3 to set "Power State" of "Power Management Feature" to be defined in the NVMe standard to the highest power state. The highest power state is, for example, a state in which I/O commands may be processed.

The timing at which the return request is transmitted is, for example, a case where the CPU 22 detects an access from the user to the storage device 3.

In step S107, the controller 32 of the storage device 3 receives the return request from the host device 2. Here, since the storage device 3 may recognize that the storage device 3 is returning to the normal state from the low power state, power of the circuit in the storage device is turned on.

In step S108, the controller 32 reads the processed security information SI2 from the buffer 25 of the host device 2 and executes verification processing and decryption processing on the read processed security information SI2. More specifically, when the verification is successful (that is, when it is determined that the read processed security information SI2 has not been tampered with), the controller 32 restores the security information SI1 from the processed security information SI2 and stores the security information SI1 in the RAM 325. Details of the verification processing and the decryption processing will be described later with reference to FIGS. 8 and 9.

In step S109, the controller 32 resumes updating the power-on time information PI. In this way, the storage device 3 is returned to the normal state from the low power state.

The details of the encryption processing and tampering prevention processing of the security information SI1 will be described below with reference to FIGS. 6 and 7. The processing shown in FIGS. 6 and 7 corresponds to step S103 in FIG. 5.

Figure 6:
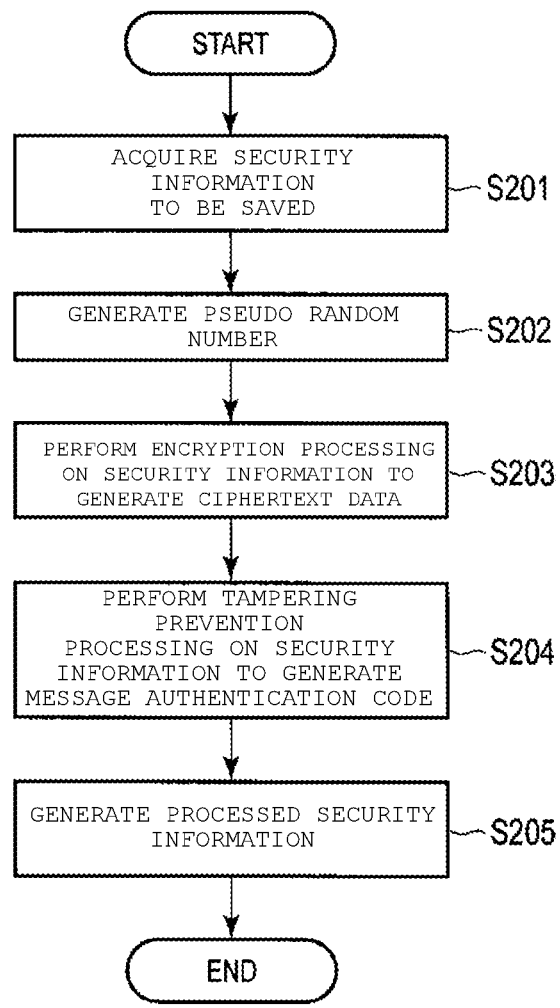
FIG. 6 is a flowchart showing an example of encryption processing and tampering prevention processing of security information according to the first embodiment.

FIG. 6 is a flowchart showing an example of encryption processing and tampering prevention processing of security information according to the present embodiment.

Figure 7:
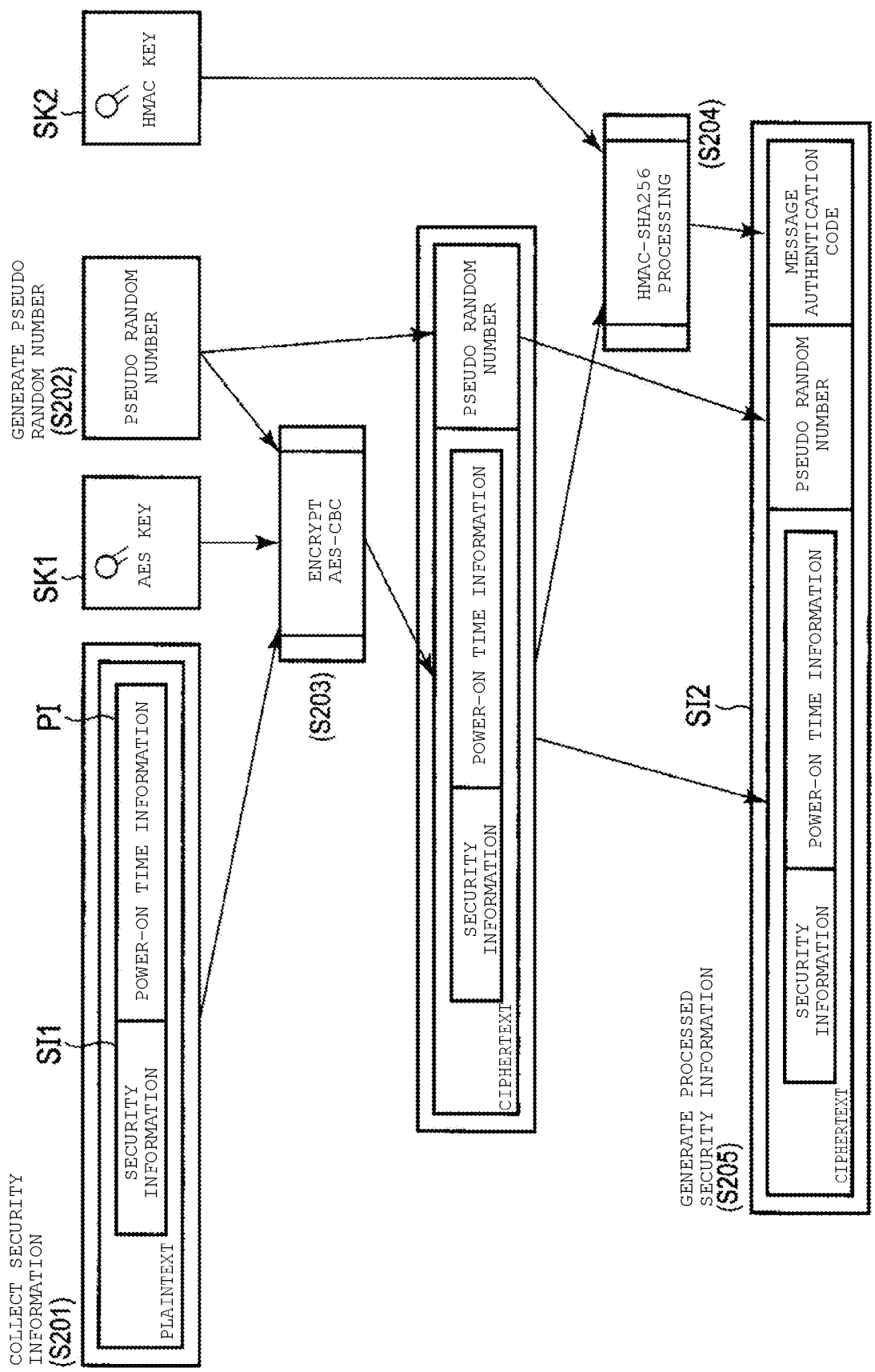
FIG. 7 is a conceptual diagram of the encryption processing and the tampering prevention processing of the security information according to the first embodiment.

FIG. 7 is a conceptual diagram of encryption processing and tampering prevention processing of security information according to the present embodiment.

In step S201, the controller 32 of the storage device 3 identifies and acquires the security information SI1 to be saved to the host device 2.

In step S202, the controller 32 generates a pseudo random number by a predetermined algorithm. The predetermined algorithm is, for example, Hash_DRBG-SHA256 or the like. In addition, the data size of the pseudo random number is, for example, 128 bits.

In step S203, the controller 32 sets plaintext data by concatenating the security information SI1 and the power-on time information PI. Then, the controller 32 encrypts the plaintext data with a predetermined encryption algorithm by using the first secret key SK1 stored in the ROM 326 and the pseudo random number generated in step S202. By this encryption processing, ciphertext data is generated. The predetermined encryption algorithm is, for example, the AES-CBC algorithm.

In step S204, the controller 32 performs tampering prevention processing on the ciphertext data generated in step S203. More specifically, the controller 32 generates message data linking the ciphertext data generated in step S203 and the pseudo random number. Then, the controller 32 generates a message authentication code (MAC value) for the message data by the predetermined algorithm by using the second secret key SK2 stored in the ROM 326. The predetermined algorithm is, for example, HMAC-SHA256 or the like.

In step S205, the controller 32 sets as processed security information SI2 the data obtained by appending the message authentication code to the message data (including ciphertext data and pseudo random number) and transmits the processed security information SI2 to the host device 2. The host device 2 stores the received processed security information SI2 in the buffer 25.

The controller 32 verifies the message authentication code when the storage device 3 returns from the low power state and determines that the processed security information SI2 has been tampered with when the message authentication code has changed.

The verification processing and the decryption processing of the processed security information SI2 will be described in detail below with reference to FIGS. 8 and 9. The processing shown in FIGS. 8 and 9 corresponds to step S108 in FIG. 5.

Figure 8:
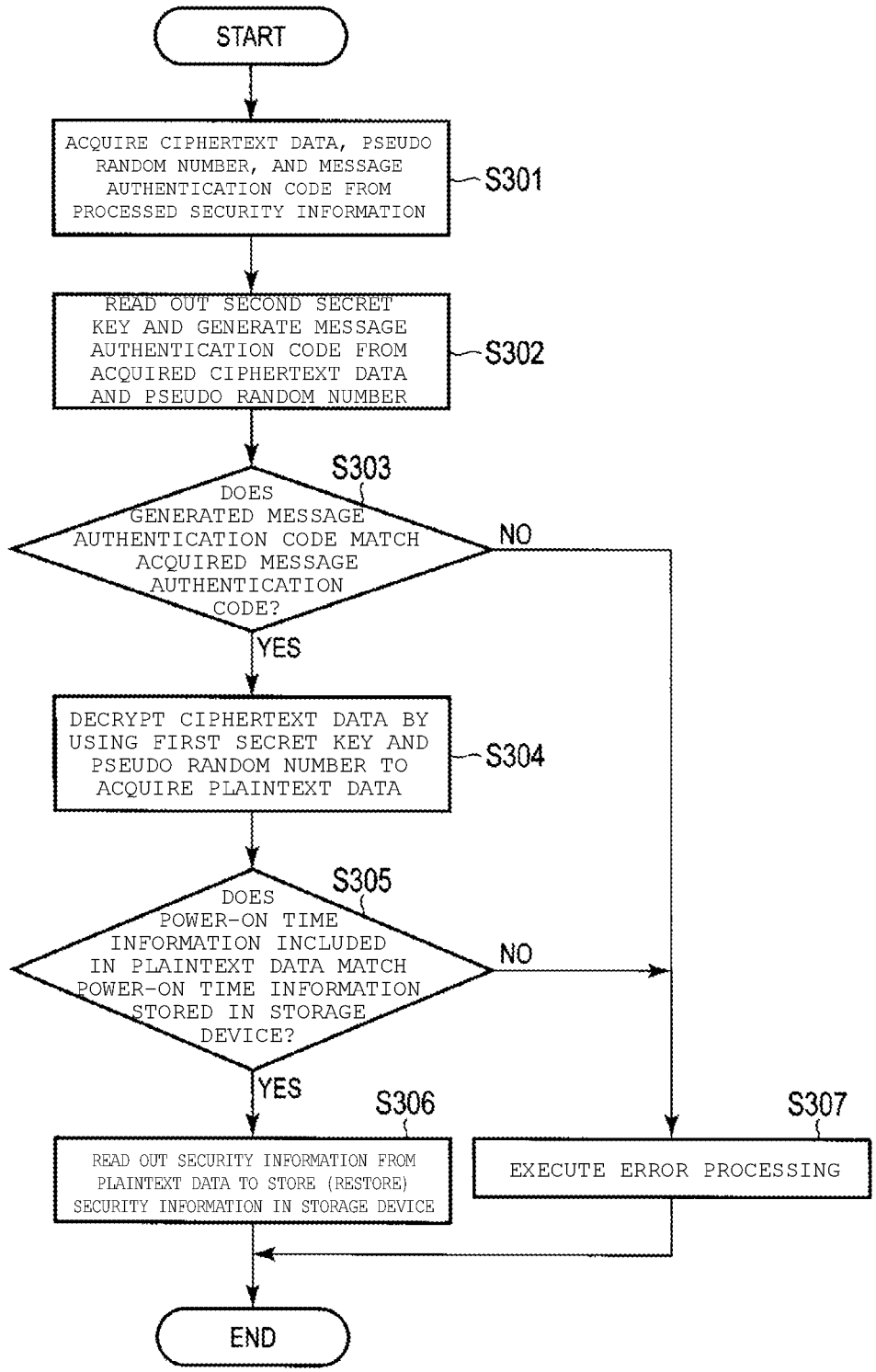
FIG. 8 is a flowchart showing an example of verification processing and decryption processing of the security information according to the first embodiment.

FIG. 8 is a flowchart showing an example of security information verification processing and decryption processing according to the present embodiment.

Figure 9:
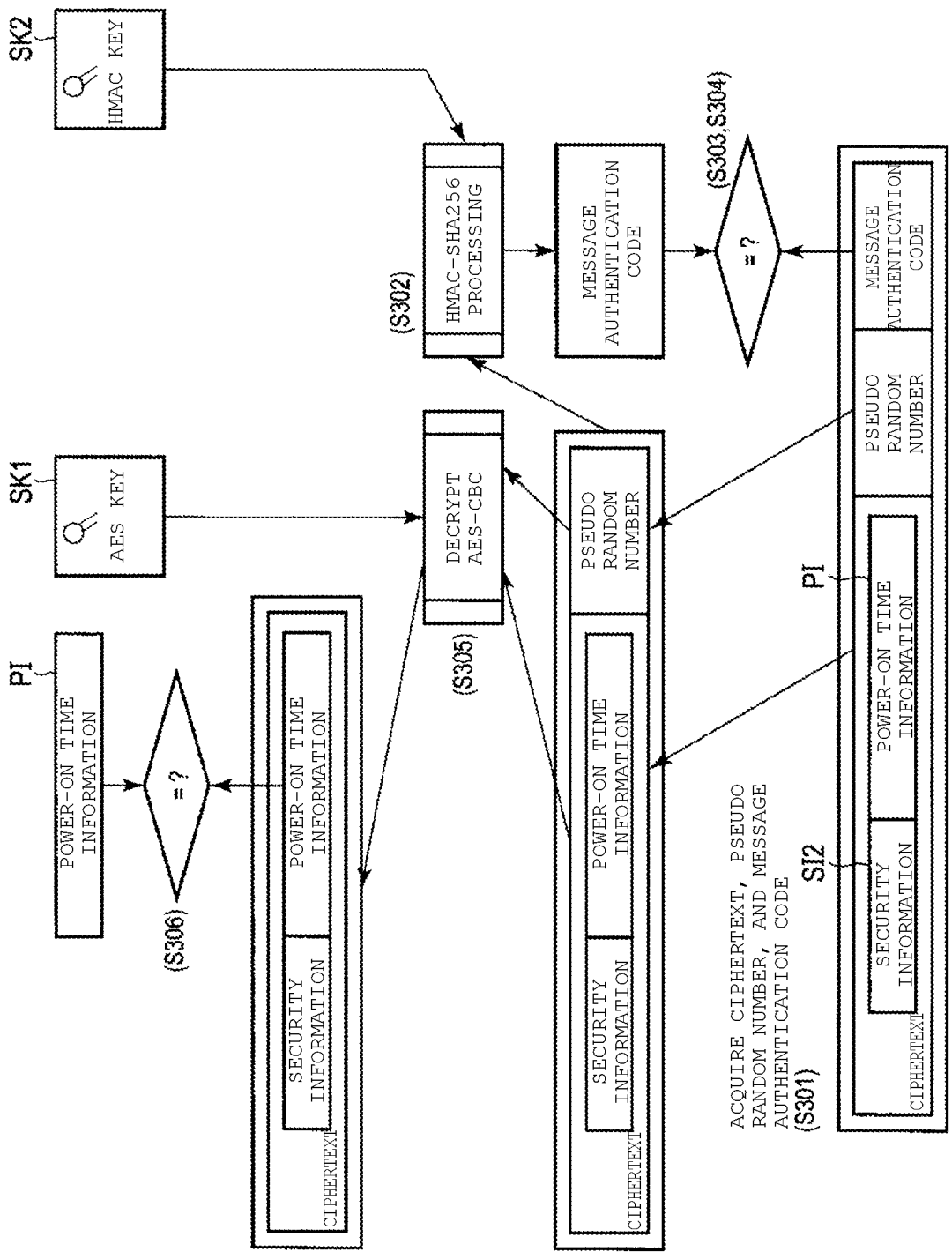
FIG. 9 is a conceptual diagram of the verification processing and the decryption processing of the security information according to the first embodiment.

FIG. 9 is a conceptual diagram of security information verification processing and decryption processing according to the present embodiment.

In step S301, the controller 32 of the storage device 3 acquires ciphertext data, a pseudo random number, and a message authentication code from the processed security information SI2. In addition, the controller 32 generates message data in which the ciphertext data and the pseudo-random number are concatenated.

In step S302, the controller 32 reads out the second secret key SK2 stored in the ROM 326. Then, the controller 32 generates a message authentication code (MAC value) for the message data by the same processing as in step S204 by using the second secret key SK2.

In step S303, the controller 32 compares the message authentication code generated in step S302 with the message authentication code acquired in step S301.

When the comparison result of both does not match, the controller 32 determines that the processed security information SI2 has been tampered with, and the processing proceeds to step S307. On the other hand, when the comparison result matches, the processing proceeds to step S304.

In step S307, the controller 32 executes error processing. More specifically, the controller 32 sets the storage device 3 to, for example, "Persistent Internal Error". After the error processing, the storage device 3 enters into a state in which the storage device 3 may not be restored until the storage device 3 is reset, for example.

In step S304, the controller 32 reads out the first secret key SK1 stored in the ROM 326. Then, the controller 32 decrypts the ciphertext data by the same algorithm as in step S204 by using the first secret key SK1 and the pseudo random number acquired in step S301. Plaintext data is generated by this decryption processing.

In step S305, the controller 32 confirms whether or not the power-on time information included in the plaintext data generated in step S304 matches the power-on time information PI stored in the storage device 3.

When the power-on time information included in the plaintext data generated in step S304 and the power-on time information PI stored in the storage device 3 do not match, the controller 32 executes the above-described error processing in step S307. On the other hand, when the two match, the processing proceeds to step S306.

In step S306, the controller 32 acquires the security information SI1 from the plaintext data generated in step S304 and stores the information in the RAM 325.

In the present embodiment described above, when a request for shifting to the low power state is received from the host device 2, the controller 32 of the storage device 3 performs encryption processing and tampering prevention processing on the security information SI1 to generate processed security information SI2. The controller 32 saves the processed security information SI2 to the buffer 25 of the host device 2. In this way, in the low power state of the storage device 3, the confidentiality and integrity of the security information SI1 may be maintained.

In other words, by performing the encryption processing and the tampering prevention processing on the highly confidential security information SI1, it is possible to save the data in the buffer 25 of the host device 2 with low security.

When the storage device 3 returns from the low power state, it is possible to detect tampered data by verifying the validity of the processed security information SI2. In addition, during this verification processing, it is possible to prevent a replay attack by confirming that the counter value of the power-on time information PI is correct.

In addition, the standby power of the storage device 3 may be reduced as compared with the case where the security information SI1 is held in the retention SRAM, the retention FF, and the like in the storage device 3, for example, by saving the security information SI1 in the buffer 25 of the host device 2 as processed security information SI2.

Similarly, since the security information SI1 is not required to be held in the nonvolatile memory (flash memory 34, ROM 326, and the like) in the storage device 3 by being saved to the host device 2, it is possible to reduce the number of times of writing data in the nonvolatile memory. That is, it is possible to prevent wearing out of the nonvolatile memory every time the storage device 3 shifts to the low power state.

In the present embodiment, the security information SI1 is encrypted and saved to the host device 2, thereby preventing leakage of the password authentication key PK and the like. More specifically, even when the host device 2 is stolen by a third party and the third party attempts to analyze the password flowing through the buses of the host device 2 and the storage device 3 by, for example, a logic analyzer, the password cannot be parsed because the password is encrypted.

In addition, during the encryption processing of the security information SI1, the power-on time information PI is used. In this way, for example, even if a third party who has stolen the storage device 3 succeeds in unlocking it once, the information necessary for unlocking it again is different. That is, information for unlocking may not be obtained merely by analyzing data flowing through the buses of, for example, the host device 2 and the storage device 3 by a third party. Consequently, as the confidentiality of the storage device 3 increases, it is possible to prevent a replay attack by the third party.

In the present embodiment, when the storage device 3 returns from the low power state, it is unnecessary to unlock the drive again, thereby improving the convenience for the user.

The storage device 3 according to the present embodiment is particularly suitable for products that have strict limitations on standby power and amount of memory such as DRAM like BGA-SSD and DRAM-less SSD.

The security information SI1 may be encrypted by another common key encryption method using the first secret key SK1. Other encryption methods are, for example, AES-CTR (counter mode), RSA method, and the like.

In addition, the security information SI1 may be subjected to tampering prevention processing by another method using the second secret key SK2. Examples of such tampering prevention processing include using an HMAC method with other hash functions and verifying a signature attached to ciphertext data by using a public key cryptography.

Instead of the power-on time information PI used in the present embodiment, other information that varies with time may be used. For example, a random number whose value changes with time may be used. In addition, instead of the power-on time information PI, information based on the serial number, model number, and the like of the storage device 3 may be used.

In addition, in step S103, the controller 32 of the storage device 3 does not have to transmit all of the processed security information SI2 subjected to the encryption processing and the tampering prevention processing to the host device 2. For example, the controller 32 may transmit only the message authentication code (MAC value) to the host device 2 and save the processed security information SI2 other than the message authentication code in the nonvolatile memory (for example, flash memory 34, ROM 326, and the like) in the storage device 3. Thereafter, in step S108, when returning from the low power state, the controller 32 verifies the tampering prevention by comparing the message authentication code received from the host device 2 with the message authentication code generated from the processed security information SI2 stored in the storage device 3. In this case, since the amount of data transmitted from the storage device 3 to the host device 2 is reduced, the effect of preventing leakage of plaintext data is further enhanced.

Second Embodiment

In the first embodiment, when the storage device 3 shifts to the low power state or when the storage device 3 returns from the low power state, the host device 2 issues a "Set Features" command of the NVMe standard to the storage device 3. In this command, the power of the storage device 3 is not completely turned off.

On the other hand, in the present embodiment, when the storage device 3 shifts to the low power state, a case where the power of the storage device 3 is completely turned off by using a unique command not defined in the NVMe standard (hereinafter, referred to as a vendor specific command) will be described. The vendor extension command is, for example, a command defined by a manufacturer or the like of the storage device 3.

According to the NVMe standard, when the power of the storage device 3 is turned off, the host memory buffer (Host Memory Buffer) of the host device 2 is also released. That is, in the present embodiment, the storage device 3 that does not support the host memory buffer is targeted.

Figure 10:
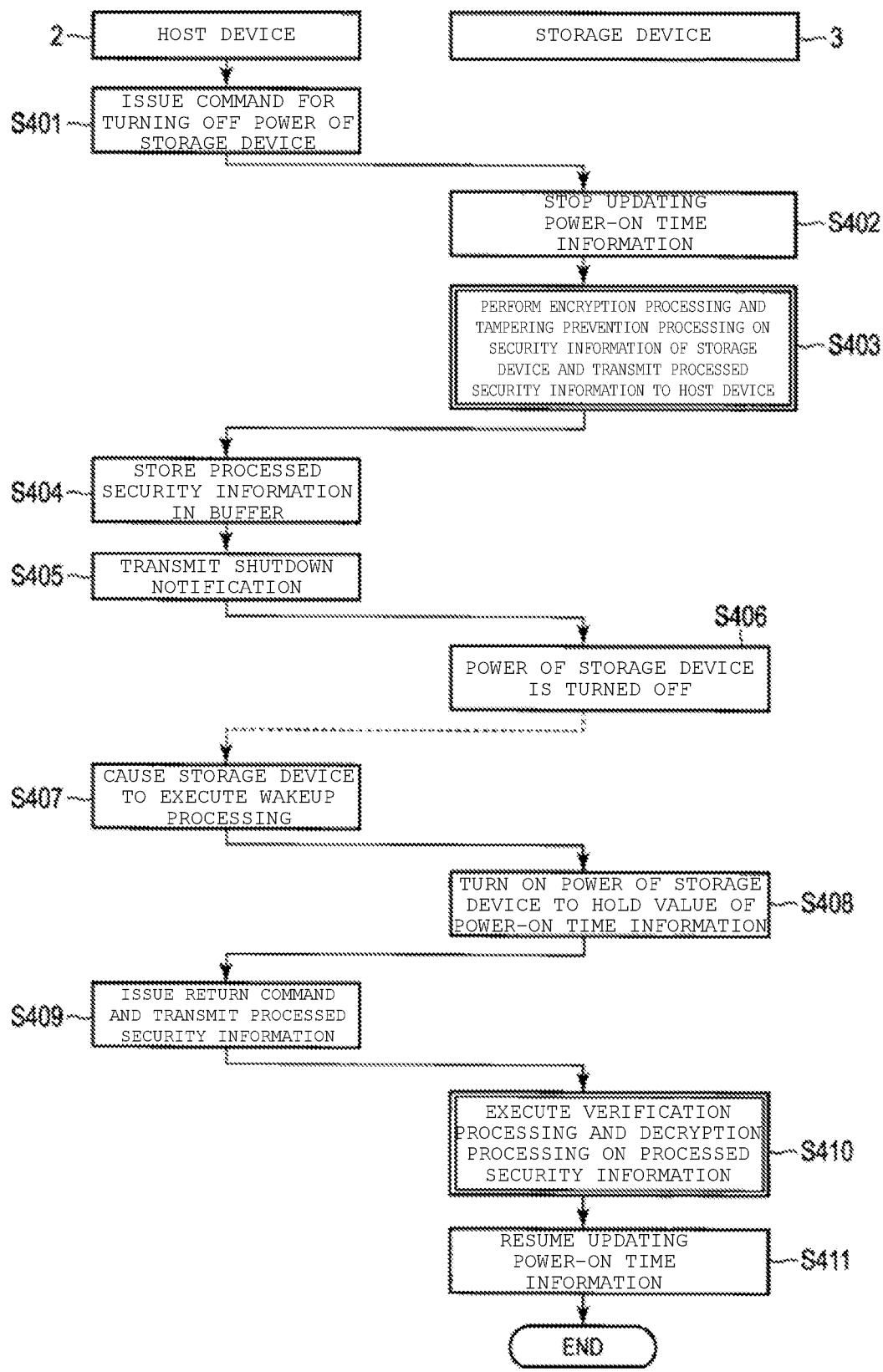
FIG. 10 is a flowchart showing an example of shift processing to a low power state and return processing from the low power state in a computer system according to a second embodiment.

FIG. 10 is a flowchart showing an example of shift processing to the low power state and return processing from the low power state in the computer system according to the present embodiment.

In the present embodiment, it is assumed that the buffer 25 of the host device 2 is not a host memory buffer of the NVMe standard. The configuration of the computer system 1 other than this is the same as in the first embodiment.

The processing of FIG. 10 corresponds to the processing of FIG. 5. In the processing shown in FIG. 10, the description of the same processing as that in FIG. 5 will be omitted.

In step S401, the CPU 22 of the host device 2 issues a command (in particular, a vendor specific command) for turning off the power of the storage device 3. After issuing the command, the host device 2 waits for the completion of the I/O commands to the storage device 3 in accordance with the shutdown sequence defined in the NVMe standard, for example, and deletes the I/O queue.

In step S402, after confirming that the I/O commands to the storage device 3 have completed in accordance with the shutdown sequence defined in the NVMe standard, the controller 32 of the storage device 3 stops updating the power-on time information PI. The value of the power-on time information PI at the time of stopping is recorded, for example, in a nonvolatile state in the flash memory 34. Since the processing of step S402 is similar to the processing of step S102, the description thereof is omitted.

In step S403, the controller 32 performs encryption processing and tampering prevention processing on the security information of the storage device 3 to generate processed security information SI2. In addition, the controller 32 transmits the generated processed security information SI2 to the host device 2 as a response to the vender specific command. The contents of the encryption processing and the tampering prevention processing are the same as those in step S103.

In step S404, the CPU 22 of the host device 2 stores the processed security information SI2 in the buffer 25.

In step S405, the CPU 22 issues a shutdown notification defined in the NVMe standard, for example, to the storage device 3. After the shutdown processing of the storage device 3 is completed, the CPU 22, for example, shifts the "Power State" of the PCIe standard to a power-off state (D3).

In this way, in step S406, the power of the storage device 3 is turned off, that is, the standby power becomes zero.

In step S407, the CPU 22 of the host device 2 causes the storage device 3 to execute wakeup processing. This wakeup processing is, for example, initialization processing defined by the PCIe standard and/or the NVMe standard.

In step S408, the power of the storage device 3 is turned on, and when the wakeup processing is completed, the storage device 3 enters normal state. Here, the storage device 3 does not distinguish between cold boot and the return from the low power state.

In addition, as the storage device 3 wakes up, the counter of the power-on time information PI restarts. For this reason, the controller 32 holds the counter value before the power-on time information PI is resumed at the time of turning on the power again in the RAM 325, the flash memory 34, or the like, separately from the resumed counter value.

In step S409, the CPU 22 of the host device 2 issues a command (in particular, a vendor specific command) for restoring the security information SI1 of the storage device 3. The CPU 22 transmits the processed security information SI2 stored in the buffer 25 to the storage device 3 together with issuance of the command.

In step S410, the controller 32 of the storage device 3 recognizes that the storage device 3 is returning from the low power state by receiving the processed security information SI2. The controller 32 executes verification processing and decryption processing on the processed security information SI2. The contents of the verification processing and the decryption processing are the same as those in step S108. As the counter value of the power-on time information PI used for the verification processing, the value held in step S408 is used.

In step S411, the controller 32 returns the counter value of the power-on time information PI to the value held in step S408 (that is, the value at the time of turning on the power). In this way, the storage device 3 is returned from the low power state.

According to the second embodiment described above, when shifting the storage device 3 to the low power state, the host device 2 causes the power of the storage device 3 to be completely turned off by using the vendor specific command. In this way, in the low power state, the computer system 1 according to the second embodiment has lower power consumption than the computer system 1 according to the first embodiment.

In addition, in the present embodiment, even in the storage device 3 that does not support the host memory buffer of the NVMe standard, since the security information SI1 may be safely saved to the host device 2 when the power is turned off, it is possible to enhance confidentiality.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device, comprising:
a controller configured to control the storage device; and
a storage area for security information, the security information including flag information indicating whether reading or writing of data from/to the storage device is permitted, and time information indicating a cumulative time value during which power of the storage device has been turned on, wherein
when a first command is received from a host device, the controller generates encrypted data by encrypting data obtained by combining the time information and the security information, and after transmitting the encrypted data to the host device, shifts the storage device to a low power state.

2. The storage device according to claim 1, wherein
when a second command is received from the host device, the controller receives the encrypted data from the host device, executes decryption processing on the encrypted data, and stores the security information and the time information obtained by the decryption processing in the storage area.

3. The storage device according to claim 2, wherein the controller
executes tampering prevention processing on the encrypted data, and transmits a first authentication code generated by the tampering prevention processing to the host device, generates a second authentication code by executing the tampering prevention processing on the encrypted data received from the host device when the second command is received along with the first authentication code, and executes the decryption processing when the first authentication code received from the host device matches the second authentication code.

4. The storage device according to claim 3, wherein the controller stores the time information in a non-volatile storage area when the first command is received, compares the time information stored in the non-volatile storage area with the time information obtained by the decryption processing when the second command is received, and stores the security information and the time information obtained by the decryption processing in the storage area when a result of the time information comparison is a match.

5. The storage device according to claim 3, further comprising:

a non-volatile memory in which a first secret key and a second secret key are stored, wherein the first secret key is used when the controller generates the encrypted data and performs the decryption processing, and the second secret key is used during the tampering prevention processing.

6. The storage device according to claim 2, wherein the first command and the second command are Set Features commands of an NVMe standard.

7. The storage device according to claim 1, wherein the security information includes authentication key data for permitting access to the storage device and encrypted key data for encrypting data to be stored in the storage device.

8. The storage device according to claim 1, wherein the storage area is a volatile memory.

9. A storage device, comprising:

a controller configured to control the storage device; and a storage area for security information, the security information including flag information indicating whether reading or writing of data from/to the storage device is permitted, and time information indicating a cumulative time value during which power of the storage device has been turned on, wherein the controller generates encrypted data by encrypting data obtained by combining the time information and the security information and stores the encrypted data in the storage device when a first command is received from a host device, executes tampering prevention processing on the encrypted data, and after transmitting a first authentication code generated by the tampering prevention processing to the host device, shifts the storage device to a low power state.

10. The storage device according to claim 9, wherein the controller receives the first authentication code from the host device along with a second command, generates a second authentication code by executing the tampering prevention processing on the encrypted data stored in the storage device, executes decryption processing on the encrypted data when the first authentication code matches the second authentication code, and stores the security information and the time information obtained by the decryption processing in the storage area.

11. The storage device according to claim 10, further comprising:

a non-volatile memory in which a first secret key and a second secret key are stored, wherein the first secret key is used when the controller generates the encrypted data and performs the decryption processing, and the second secret key is used during the tampering prevention processing.

12. The storage device according to claim 10, wherein the first command and the second command are Set Features commands of an NVMe standard.

13. The storage device according to claim 9, wherein the security information includes authentication key data for permitting access to the storage device and encrypted key data for encrypting data to be stored in the storage device.

14. The storage device according to claim 9, wherein the storage area is a volatile memory.

15. The storage device according to claim 9, wherein the low power state is a power off state.

16. A non-transitory computer readable medium storing instructions to be executed by a processor of a storage device, wherein the storage device has a storage area for security information, the security information including flag information indicating whether reading or writing of data from/to the storage device is permitted, and time information indicating a cumulative time value during which power of the storage device has been turned on, and the instructions executed by the processor cause the storage device to carry out the steps of:

responsive to a first command received from a host device, generating encrypted data by encrypting data obtained by combining the time information and the security information;

transmitting the encrypted data to the host device; and then shifting the storage device to a low power state.

17. The non-transitory computer readable medium according to claim 16, wherein the instructions executed by the processor cause the storage device to further carry out the steps of:

responsive to a second command received from the host device along with the encrypted data, executing decryption processing on the encrypted data; and storing the security information and the time information obtained by the decryption processing in the storage area.

18. The non-transitory computer readable medium according to claim 17, wherein the instructions executed by the processor cause the storage device to further carry out the steps of:

executing tampering prevention processing on the encrypted data, and transmitting a first authentication code generated by the tampering prevention processing to the host device;

generating a second authentication code by executing the tampering prevention processing on the encrypted data received from the host device when the second command is received along with the first authentication code; and executing the decryption processing when the first authentication code received from the host device matches the second authentication code.

19. The non-transitory computer readable medium according to claim 18, wherein the instructions executed by the processor cause the storage device to further carry out the steps of:
- storing the time information in a non-volatile storage area when the first command is received;
- comparing the time information stored in the non-volatile storage area with the time information obtained by the decryption processing when the second command is received; and
- storing the security information and the time information obtained by the decryption processing in the storage area when a result of the time information comparison is a match.

20. The non-transitory computer readable medium according to claim 18, wherein
- the storage device further includes a non-volatile memory in which a first secret key and a second secret key are stored,
- the first secret key is used to generate the encrypted data and during the decryption processing,
- and the second secret key is used during the tampering prevention processing.

* * * * *